March 31, 1936.  A. B. BELL  2,035,451
AUXILIARY SEAT
Filed Oct. 15, 1930  3 Sheets-Sheet 1
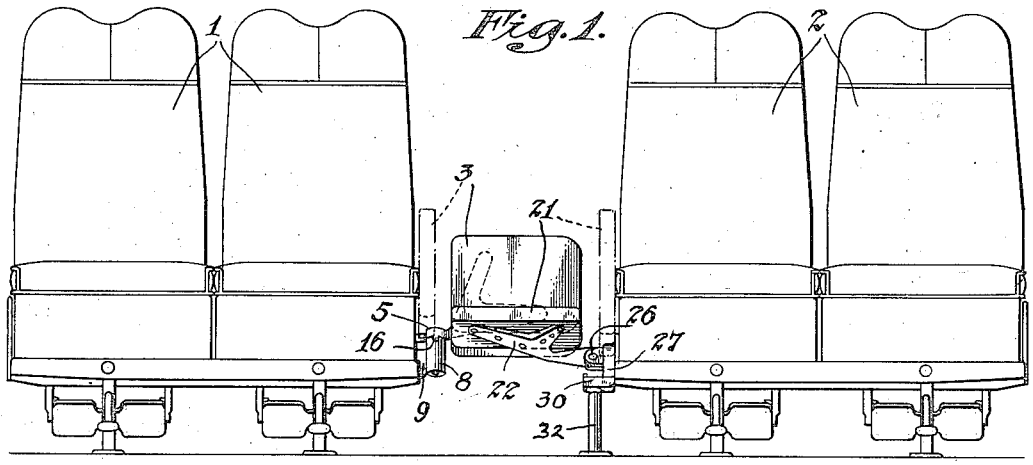
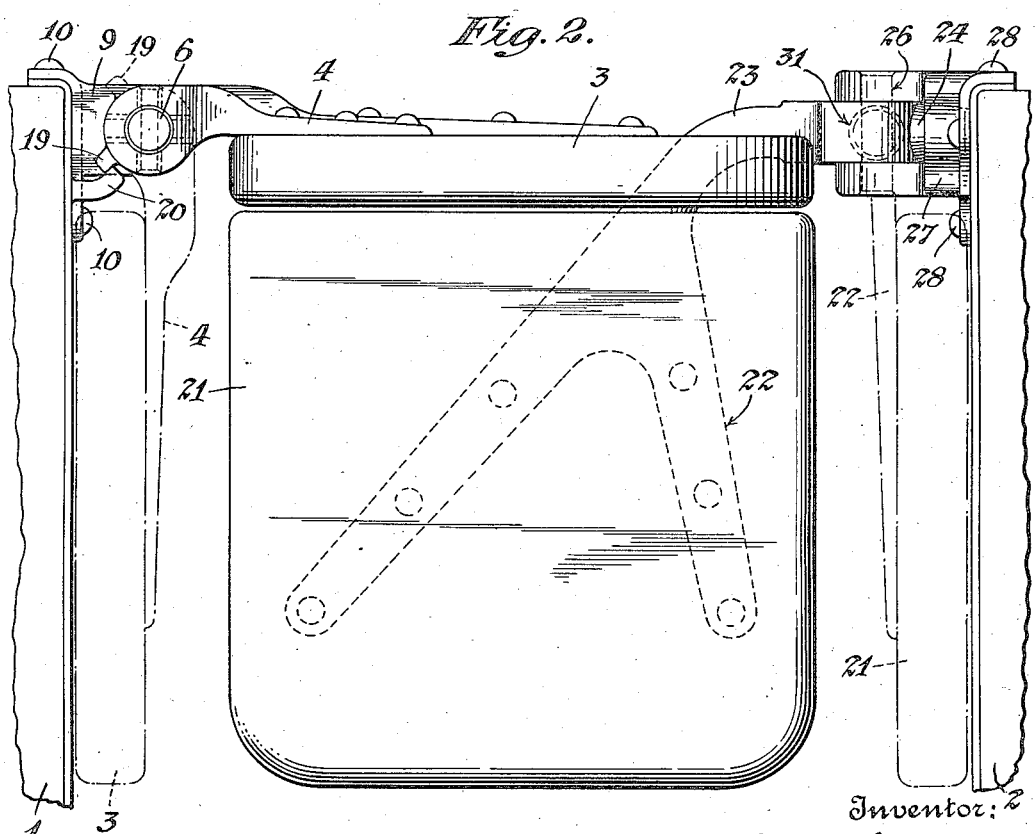
Inventor:
Alfred B. Bell
By his Attorney
Henry Van Arsdale

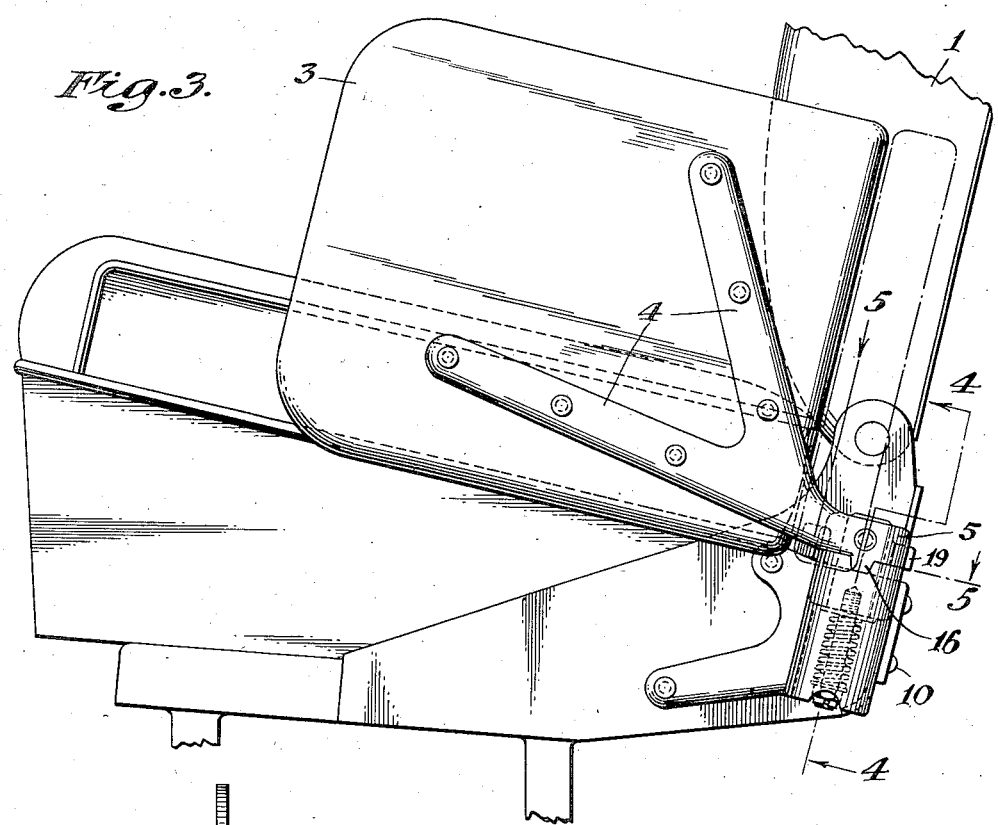
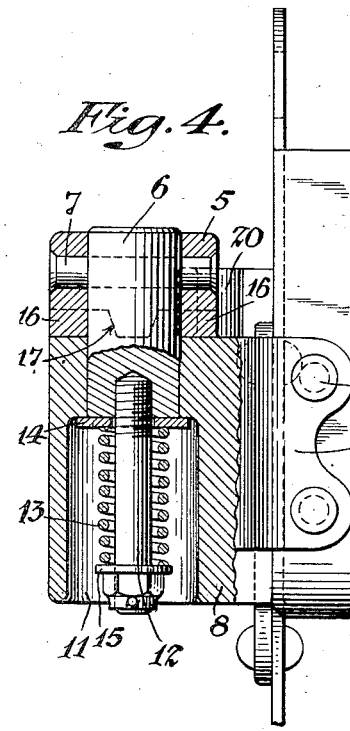
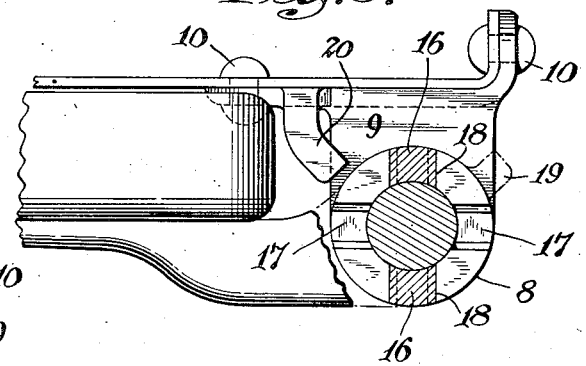

March 31, 1936. A. B. BELL 2,035,451
AUXILIARY SEAT
Filed Oct. 15, 1930 3 Sheets-Sheet 3
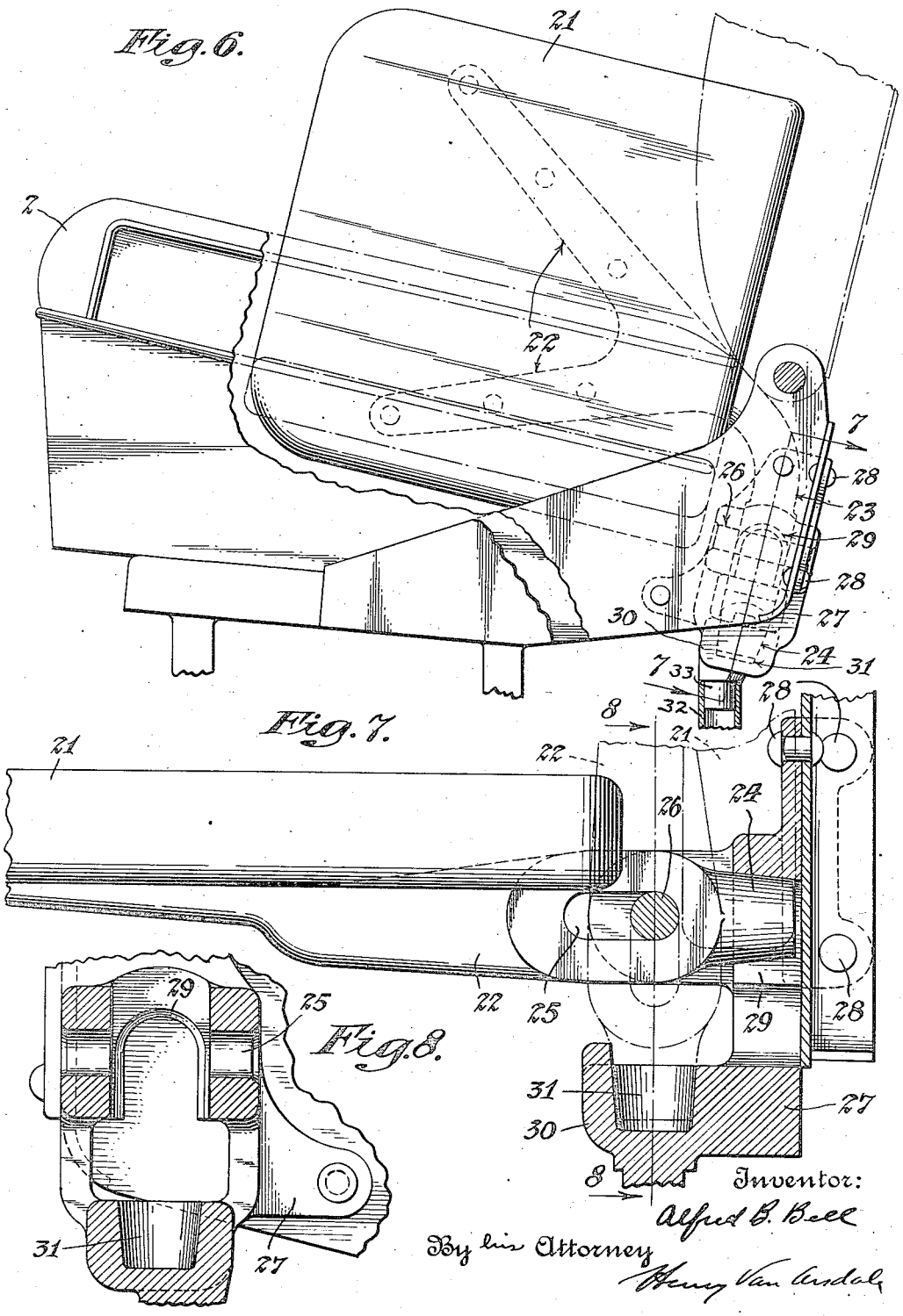

Patented Mar. 31, 1936

2,035,451

UNITED STATES PATENT OFFICE 2,035,451

AUXILIARY SEAT

Alfred B. Bell, Philadelphia, Pa., assignor, by mesne assignments, to Heywood-Wakefield Company, Gardner, Mass., a corporation of Massachusetts Application October 15, 1930, Serial No. 488,731

3 Claims. (Cl. 155—33)

This invention relates to auxiliary seats, and more particularly to an arrangement whereby the arm rests of seats on opposite sides of an aisle may be adjusted to provide a seat in the aisle between them.

In the transportation of passengers by bus or similar vehicle, it is important to conserve seating space to the utmost, and at the same time provide maximum comfort for the passengers. To this end it is often desirable to provide additional auxiliary seats in the aisle to accommodate a surplus of passengers. At the same time, when there is no such surplus of passengers, it is desirable to have the aisle free and clear. The provision of separate and removable auxiliary aisle seats would be objectionable, since such constructions, when removed from the aisle, would take up valuable room which might otherwise be occupied by the passengers.

It is well known that an arm rest increases the comfort of a passenger occupying a seat in a bus or similar vehicle. Therefore, I propose to provide arm rests on the seats of busses or similar vehicles, such that the arm rests of two seats on opposite sides of an aisle may be readily and easily adjusted to provide a seat in the aisle between them, such aisle seat including a supporting or seat member and also a back; and this is one of the principal objects of this invention. Another object of this invention is to provide a member adjustable into one position in which it will serve as a comfortable arm rest for a seat, and adjustable into another position to form a part of an auxiliary seat adjacent the seat which said member served as an arm rest. A further object of this invention is to provide an auxiliary seat and arm rest construction of the character described, which is simple, sturdy and durable, and is readily and easily adjustable into either position. Other objects of this invention will be in part obvious and in part pointed out hereinafter.

The invention accordingly consists in the features of construction, combinations of elements and arrangements of parts which will be more fully pointed out hereinafter and shown in the accompanying drawings, and the scope of the application of which will be indicated in the claims that follow.

In order that a clearer understanding of this invention may be had, attention is hereby directed to the accompanying drawings, forming a part of this application, and illustrating certain possible embodiments of this invention.

Referring to the drawings, Fig. 1 is a front view of two seats, showing in full lines the arm rests of these seats adjusted to form an auxiliary seat between them, and showing in dotted lines the arm rest positions of the parts;

Fig. 2 is an enlarged top view of the aisle portion of the same;

Fig. 3 is an end view of the aisle end of one of the seats, certain parts of the seat being broken away, the position of the arm rest when serving as the back of the aisle seat being indicated by dot and dash lines;

Fig. 4 is a sectional view thereof, and is taken on the line 4—4 of Fig. 3;

Fig. 5 is a sectional view thereof, and is taken on the line 5—5 of Fig. 3;

Fig. 6 is an end view of the aisle end of the opposite seat, certain parts being broken away, the position of the arm rest when serving as the seat member of the aisle seat being indicated by dot and dash lines;

Fig. 7 is an enlarged sectional view thereof, with the combined arm rest and seat member lowered, and is taken on the line 7—7 of Fig. 6; and Fig. 8 is a sectional view thereof with the arm rest member removed, and is taken on the line 8—8 of Fig. 7.

Similar reference characters refer to similar parts throughout the several views of the drawings.

Referring to the drawings, there is shown therein two seats or chairs 1 and 2, having an aisle between them. At the aisle end of seat 1 there is a member 3 of suitable shape and construction, so that when it is positioned against the end of the seat, as shown by dot and dash lines in Figs. 1 and 2, it serves as a comfortable arm rest for an occupant of the seat, and when placed in position extending across the aisle, it forms a comfortable back rest for an occupant of the auxiliary aisle seat.

A supporting arm or bracket member 4 is secured to the aisle seat of member 3. Member 4 has a hub 5 in which is secured a pin or stud 6, as by means of pin 7 which penetrates the hub and stud 6. The lower end of stud 6 protrudes downwardly beyond the hub 5 and rests in bearing 8 formed on a casting 9, which is secured to the seat 1, as by means of bolts or rivets 10. Bearing 8 is provided with a recess 11 below the position taken by stud 6 therein, and in this recess is disposed a screw 12 which is in threaded engagement with the lower end of stud 6. A compression spring 13 surrounds pin 12 and is compressed between washer 14, which engages the upper shoulders of recess 11, and a washer or collared bolt 15, which is secured to the lower end of pin 12. Thus spring 13 resiliently holds the hub 5 downwardly against the bearing member 8.

Two diametrically opposite projections 16 are formed on the lower surface of hub 5 and two pairs of recesses, pair 17 and pair 18, are formed in the top of bearing 8. When member 3 is in position to serve as an arm rest of the seat, the projections 16 seat in the recesses 18, and when the member 3 is in position to serve as the back of the auxiliary aisle seat, the projections 16 seat in the recesses 17. Meanwhile, the spring 13 holds the projections firmly in the recesses, thus securing steadiness. Preferably, the projections 16 and the recesses 17 and 18 have tapered sides so that a person can readily and easily move the member 3 from either position to the other.

To prevent the member 3 from being moved beyond its correct position for serving as the back of the auxiliary seat, a projection 19 may be formed on the hub 5 which is adapted to engage a projection 20 formed on the casting 9 to stop the member 3 in proper position. The engagement between lugs 19 and 20 further reinforces and steadies the seat against back pressure applied by a person occupying the auxiliary seat.

At the aisle end of the opposite seat 2 there is provided a member 21 of suitable construction, so that when raised to arm rest position, it will provide a comfortable arm rest for an occupant of seat 2, and when rotated 90° in a vertical plane to assume position across the aisle, it will serve as a comfortable seat on which an occupant of the auxiliary aisle seat may sit.

To the aisle side of member 21 is secured a bracket or arm 22. This bracket has a projecting portion 23 terminating in a tapered lug end 24 and is provided with an elongated slot 25 adjacent thereto. Projecting portion 23 of arm 22 is hinged on a pin 26 which extends through slot 25 and is carried on a bracket 27 which is secured to the aisle end of seat 2, as by means of rivets 28. Bracket 27 has a vertical portion provided with a recess forming a pocket 29 for the lug end 24 of the arm 22 when the member 21 is in horizontal position, and has a horizontal portion 30 provided with a socket 31 adapted to receive the lug end 24 of the arm member 22 when member 21 is in vertical position.

The construction may be braced and steadied by means of a foot or leg 32, having a hollow at the top, and in which is seated a boss or extension 33 formed on the casting 27.

When it is desired to form the auxiliary seat in the aisle, the member 3 of seat 1 is swung into position across the aisle, preferably member 3 being first lifted sufficiently to disengage the projections 16 from the recesses 17 to facilitate the initial movement. Member 21 of seat 2 is then lifted sufficiently to disengage the lug 24 from the socket 31 and rotated outwardly 90° into position across the aisle in front of the member 3. Member 21 cannot be lowered any further due to the engagement of lug 24 with the upper wall of the pocket wall 29.

To cause the auxiliary aisle seat to disappear, and to restore the arm rests to the seats 1 and 2, it is merely necessary to raise member 21 into arm rest position, where it will be automatically locked and held by reason of the dropping of lug 24 into socket 31, and then to swing member 3 against the side of seat 1, where this member will be automatically locked and held by the engagement of the projections 16 in recesses 18 and stabilized by the spring 13.

It is believed that the simplicity, durability and convenience of the construction will be appreciated without further description, and that the increased seating accommodations, with utmost economy of space, secured by utilizing members which may serve either as arm rests or to form auxiliary seats, as and when desired, will be obvious to anyone acquainted with this art.

As many changes could be made in the above construction and as many apparently widely different embodiments of the invention could be made without departing from the scope thereof, it is to be understood that all matter contained in the above description or shown in the accompanying drawings be interpreted as illustrative and not in a limiting sense.

What I claim is:

1. In seating of the character described, in combination, a main seat, an arm rest and seat member pivotally supported on one end of the seat and in one position adapted to serve as an arm rest of the seat and in another position adapted to serve as an auxiliary seat alongside the end of the main seat, a supporting arm secured to said member and having a portion extending from said member, said extending portion having a slot inwardly of its end, and a bracket secured to the main seat and having a pin penetrating said slot, whereby said arm and member are pivotally and shiftably supported on said pin, said bracket having a socket positioned to receive the extending portion of said arm when the member carried by the arm is in one shifted position on the pin and in normal arm rest position on its seat, whereby said member is held in such position, said bracket having a pocket positioned to receive the extending portion of said arm when the member is in another shifted position on the pin and in position to serve as an auxiliary seat, whereby said member is held in the latter position, said pin and slot engagement permitting said arm rest and seat member when in arm rest position to be shifted to disengage the said arm from the socket engaged thereby and to be lowered into auxiliary seat position.

2. The combination with a seat and an arm rest therefor, of means movably securing said arm rest to one end of the seat, said means including an upwardly open socket and a hinge pin secured to one end of the seat, a member secured to the arm rest and having a nose engaging in said socket and having a portion provided with a slot embracing said pin with the pin spaced from the lower end of the slot when the arm rest is in vertical position, whereby said means permit the arm rest, when in vertical position, to be shifted upwardly to disengage said nose from said socket and then to be pivoted into horizontal position alongside the end of the seat, and means, including a pocket at the end of the seat and engaged by said nose when the arm rest is in said shifted and horizontal position, for sustaining said arm rest in said position and for holding said arm rest against inward shifting on said pin.

3. The combination of two seats in spaced end to end relation, an arm rest member on each of the adjacent ends of the seats, means mounting one of said members to swing on an approximately vertical axis selectively into back rest position between said seats and into arm rest position on the seat, including a stud on the arm rest member and a co-acting bearing member therefor on this seat end, detent means associated with said stud and bearing member to resiliently resist movement of said arm rest member out of arm rest position and out of back rest position selectively, means mounting the other arm rest member to swing and shift on an approximately horizontal axis selectively into outwardly shifted seating position between said seats and into inwardly shifted arm rest position on the seat, including a slotted member on the arm rest member and a bearing pin on the seat end seating in said slot, and means, including a projection on the arm rest member and two members on the end of the seat engageable selectively by said projection, for maintaining said arm rest in inwardly shifted arm rest position and in outwardly shifted seating position selectively.

ALFRED B. BELL.